US011013246B2

(12) United States Patent
Deuerer

(10) Patent No.: US 11,013,246 B2
(45) Date of Patent: May 25, 2021

(54) LIQUID ANIMAL FEED FOR DOMESTIC CATS OR DOGS AND METHODS FOR PRODUCING SAME

(71) Applicant: Growth Finance Plus AG, Grommiswald (CH)

(72) Inventor: Hans-Jürgen Deuerer, Bretten (DE)

(73) Assignee: GROWTH FINANCE PLUS AG, Grommiswald (CH)

( * ) Notice: Subject to any disclaimer, the term of this patent is extended or adjusted under 35 U.S.C. 154(b) by 0 days.

(21) Appl. No.: 14/877,498

(22) Filed: Oct. 7, 2015

(65) Prior Publication Data

US 2016/0021914 A1 Jan. 28, 2016

Related U.S. Application Data

(63) Continuation of application No. PCT/EP2014/057211, filed on Apr. 9, 2014.

(30) Foreign Application Priority Data

Apr. 9, 2013 (DE) .................. 10 2013 103 541.8

(51) Int. Cl.
*A23K 10/00* (2016.01)
*A23K 20/147* (2016.01)
(Continued)

(52) U.S. Cl.
CPC ............ *A23K 20/147* (2016.05); *A23C 3/023* (2013.01); *A23C 9/1526* (2013.01);
(Continued)

(58) Field of Classification Search
CPC .. A23K 20/142; A23K 20/147; A23K 20/158; A23K 10/00; A23K 10/16;
(Continued)

(56) References Cited

U.S. PATENT DOCUMENTS 4,804,546 A * 2/1989 Sawhill .................. A23K 10/33
                    426/602
5,017,389 A * 5/1991 Green .................. A23K 20/174
                    426/590

(Continued)

FOREIGN PATENT DOCUMENTS

EP  0 241 097 A1 10/1987
EP  1 527 699 A1 5/2005
(Continued)

OTHER PUBLICATIONS

Milk Composition NPL, published Jun. 5, 2007, https://web.archive.org/web/20070605083201/http://www.milkfacts.info/Milk%20Composition/Milk%20Composition%20Page.htm (Year: 2007).*

(Continued)

*Primary Examiner* — Drew E Becker
*Assistant Examiner* — Bryan Kim
(74) *Attorney, Agent, or Firm* — Bose McKinney & Evans LLP

(57) ABSTRACT

The disclosure relates to a liquid, milk-based animal feed for domestic cats or dogs, containing at least 70 vol % water, 2-13 vol % milk protein, 2-13 vol % milk fat, 1-5 vol % starch as an essential thickener, at least 0.01 vol % amino acid additive, and at least 0.01 vol % plant-based sugar. The disclosure also relates to a method for producing such an animal feed.

21 Claims, 1 Drawing Sheet

(51) Int. Cl.
| | |
|---|---|
| *A23K 50/48* | (2016.01) |
| *A23K 20/163* | (2016.01) |
| *A23K 20/142* | (2016.01) |
| *A23K 20/158* | (2016.01) |
| *A23C 3/023* | (2006.01) |
| *A23L 3/10* | (2006.01) |
| *B65D 81/34* | (2006.01) |
| *A23C 9/154* | (2006.01) |
| *A23C 9/152* | (2006.01) |

(52) U.S. Cl.
CPC .......... *A23C 9/1544* (2013.01); *A23K 20/142* (2016.05); *A23K 20/158* (2016.05); *A23K 20/163* (2016.05); *A23K 50/48* (2016.05); *A23L 3/10* (2013.01); *B65D 81/3415* (2013.01); *A23V 2002/00* (2013.01); *A23V 2200/08* (2013.01)

(58) Field of Classification Search
CPC ........ A23K 10/20; A23K 10/24; A23K 10/28; A23K 50/00; A23K 50/40; A23K 50/48; A23L 29/20; A23L 29/206; A23L 29/212; A23L 29/219; A23L 29/225; A23L 29/256
See application file for complete search history.

(56) References Cited

U.S. PATENT DOCUMENTS

| | | | | | |
|---|---|---|---|---|---|
| 5,252,346 | A * | 10/1993 | Krause | ................... | A23K 40/00 426/623 |
| 5,614,243 | A * | 3/1997 | Dunn | ................... | A23G 3/346 426/578 |
| 5,792,501 | A | 8/1998 | Lepine | | |
| 6,245,379 | B1 * | 6/2001 | Lepine | ................... | A23C 11/04 426/583 |
| 6,248,390 | B1 * | 6/2001 | Stillman | ................... | A61P 9/14 426/590 |
| 6,458,378 | B1 * | 10/2002 | Sunvoid | ................ | A23K 50/40 424/442 |
| 6,471,999 | B2 * | 10/2002 | Couzy | ................... | A23C 9/1206 426/2 |
| 6,475,539 | B1 * | 11/2002 | DeWille | ................... | A23L 2/38 426/573 |
| 6,613,368 | B2 * | 9/2003 | Kloti | ................... | A23K 20/147 426/574 |
| 6,685,978 | B1 * | 2/2004 | Hauksson | ............ | A23B 4/0235 426/573 |
| 7,252,836 | B2 * | 8/2007 | Brown | ................... | A21D 2/186 424/438 |
| 8,192,778 | B2 * | 6/2012 | Kopesky | ................... | A01N 25/10 426/573 |
| 8,541,041 | B2 * | 9/2013 | Pilling | ................... | A23L 29/20 426/573 |
| 8,673,383 | B2 * | 3/2014 | Neufeld | ................ | A23K 10/32 426/2 |
| 8,968,806 | B2 * | 3/2015 | Delaney | ................. | A23K 20/20 426/72 |
| 8,999,409 | B2 * | 4/2015 | Deuerer | ................. | A23K 1/106 426/105 |
| 9,839,656 | B2 * | 12/2017 | Holvoet | ................. | A61K 38/018 |
| 2002/0192347 | A1 * | 12/2002 | Couzy | ................... | A23C 9/1206 426/580 |
| 2003/0128899 | A1 * | 7/2003 | Dennis | ................... | B65D 75/58 383/202 |
| 2003/0194468 | A1 * | 10/2003 | Konkoly | ............... | A23C 9/1322 426/34 |
| 2004/0037942 | A1 | 2/2004 | Shah | | |
| 2005/0013899 | A1 * | 1/2005 | Kostlan | ................ | A01K 5/0114 426/2 |
| 2005/0019394 | A1 * | 1/2005 | Xia | ................... | A23L 29/256 424/464 |
| 2006/0068075 | A1 * | 3/2006 | Fultz | ................... | A23C 9/1307 426/583 |
| 2006/0216357 | A1 * | 9/2006 | Cupp | ................... | A61K 35/20 424/535 |
| 2007/0202211 | A1 * | 8/2007 | Altom | ................... | A23K 40/20 426/2 |
| 2007/0281068 | A1 * | 12/2007 | Boff | ........................ | A23L 2/38 426/588 |
| 2008/0187574 | A1 * | 8/2008 | Holliday | ................ | A23K 10/12 424/442 |
| 2008/0233245 | A1 * | 9/2008 | White | ................... | A23L 33/175 426/73 |
| 2008/0233248 | A1 * | 9/2008 | Swenke | ............... | A23K 20/174 426/231 |
| 2008/0241313 | A1 * | 10/2008 | Miller | ................... | A23K 20/163 426/2 |
| 2009/0162509 | A1 * | 6/2009 | Banken | ................... | A23L 33/19 426/521 |
| 2009/0258112 | A1 * | 10/2009 | Engels | ................. | A61K 36/185 426/72 |
| 2009/0311197 | A1 | 12/2009 | Romanowski et al. | | |
| 2010/0278981 | A1 * | 11/2010 | Ervin | ................... | A23L 33/115 426/250 |
| 2012/0040051 | A1 * | 2/2012 | Chen | ................... | A23C 9/1209 426/41 |
| 2012/0093973 | A1 * | 4/2012 | Parthasarathy | ........... | A23L 2/38 426/2 |
| 2012/0213889 | A1 * | 8/2012 | Chiang | ................... | A23J 3/341 426/57 |
| 2013/0084271 | A1 * | 4/2013 | Kelly | ................... | A61K 36/064 424/93.44 |
| 2013/0224338 | A1 * | 8/2013 | Darchuk | ................ | A23C 9/152 426/73 |
| 2013/0230623 | A1 * | 9/2013 | Sibakov | ................ | A23C 9/1206 426/42 |
| 2013/0259973 | A1 * | 10/2013 | Valdez | ................... | C12P 19/04 426/28 |
| 2013/0344010 | A1 * | 12/2013 | Pompejus | ................ | A61K 8/99 424/50 |
| 2014/0087049 | A1 * | 3/2014 | Ankolekar | ............... | A23L 27/30 426/548 |
| 2014/0093609 | A1 * | 4/2014 | Roy | ........................ | A23L 2/395 426/2 |
| 2014/0227386 | A1 * | 8/2014 | Niceron | ................ | A23K 1/1634 426/2 |
| 2015/0010671 | A1 * | 1/2015 | Gaufres | ................ | A23K 10/12 426/2 |
| 2015/0201635 | A1 * | 7/2015 | Graf | ........................ | A23C 9/158 426/2 |
| 2016/0073659 | A1 * | 3/2016 | Zemel | ................... | A23K 40/25 426/2 |

FOREIGN PATENT DOCUMENTS

| | | | | |
|---|---|---|---|---|
| NL | 0241097 A1 * | 10/1987 | .......... | A23C 9/1307 |
| WO | WO 89/10066 | 11/1989 | | |
| WO | WO 2009/029893 A1 | 3/2009 | | |
| WO | WO 2010/114627 A1 | 10/2010 | | |
| WO | WO-2010133376 A1 * | 11/2010 | ............. | A23K 10/26 |

OTHER PUBLICATIONS

Inulin NPL, published May 14, 2011, https://web.archive.org/web/20110514225052/https://www.medicinenet.com/inulin/supplements-vitamins.htm (Year: 2011).*

Whey NPL, published Sep. 21, 2009, https://www.uspharmacist.com/article/whey-protein-health-benefits-at-a-glance (Year: 2009).*

Fat NPL, published Mar. 18, 2012, https://web.archive.org/web/20120318053345/http://www.scrollseek.com/training/densitiesofdifferentbodymatter.html (Year: 2012).*

Glucose NPL, published Oct. 20, 2008, https://web.archive.org/web/20081020084221/http://www.chemspider.com/Chemical-Structure.96749.html (Year: 2008).*

Protein NPL, published online Jul. 28, 2010, https://www.degruyter.com/view/journals/zkri/213/7-8/article-p369.XML (Year: 2010).*

(56) References Cited

OTHER PUBLICATIONS

Starch NPL, published Oct. 16, 2005, https://web.archive.rg/web/20051016101420/http://www.inchem.org/documents/icsc/icsc/eics1553.htm (Year: 2005).*

Viscosity NPL, published Aug. 4, 2004, https://web.archive.org/web/20040804060051/http://hyperphysics.phy-astr.gsu.edu/hbase/Tables/viscosity.html (Year: 2004).*

Singh, "The milk fat globule membrane—A biophysical system for food applications", published online Dec. 20, 2005, https://www.sciencedirect.com/science/article/pii/S1359029405001202 (Year: 2005).*

Royal Canin: Babydog milk, Marz, 2012, http://www.royal-canin.de/fileadmin/icd/868470117/GROWTH_Babydog_Milk_Produktblatt_2012_03.pdf.

Canina pharma GmbH: Produktkatalog, Sep. 20, 2012, http://canina.de/out/useruploads/fileslCanina_Produktbroschuere_2012_v2.pdf.

Roempp_D-Glucose (RÖMPP Online, entry "Stärke", Version 3.37, http://www.roempp.com/prod/, document identifier: RD-07-01370).

Roempp_Staerke (RÖMPP Online, entry "Stärke", Version 3.37, http://www.roempp.com/prod/, document identifier: RD-19-03654).

MilchKatzenGimpet_2013 (Fressnapf Tiernahrungs GmbH: Milch für Katzen 14×200 ml, Jun. 2, 2013, http:///www.fressnapf.de/shop/milch-fuer-katzen-14-x-200-ml).

* cited by examiner

LIQUID ANIMAL FEED FOR DOMESTIC CATS OR DOGS AND METHODS FOR PRODUCING SAME

RELATED APPLICATIONS

This application is a continuation of PCT/EP2014/057211, filed Apr. 9, 2014, which claims priority to DE 10 2013 103 541.8, filed Apr. 9, 2013, both of which are hereby incorporated herein by reference in their entireties.

BACKGROUND

The invention relates to a milk-based liquid animal feed for domestic cats or dogs.

A milk-based liquid animal feed is known as a supplementary feed for domestic cats. Such an animal feed is known commercially as cat milk, which is usually produced from reduced-lactose cow's milk and contains vitamin supplements.

SUMMARY

This disclosure teaches a liquid animal feed for domestic cats that will be easy to administer, easily digestible and readily accepted by cats.

An animal feed according to this disclosure is produced on the basis of milk, preferably cow's milk, and contains at least 70 vol % water, 2 vol % to 13 vol % milk protein and 2 vol % to 13 vol % milk fat. The animal feed preferably contains 6 vol % to 13 vol % milk fat. The animal feed preferably contains 2 vol % to 6 vol % milk protein.

Despite its high water content of at least 70 vol %, the animal feed according to this disclosure is viscous because it contains 1 to 5 vol % starch as a thickener, for example, cornstarch, guar gum, carrageenan, xanthan or carob bean gum. Viscous cat food can be administered much more easily than traditional milk because it does not splash so easily or spill during feeding. The viscous animal feed is preferably packaged in bags, for example, tubular bags and four-sided sealed pouches. Even small portions of 5 g to 15 g, for example, can be packaged inexpensively and administered with no problem in this way.

Starch and thickeners may form hydrocolloids, which result in a thixotropic behavior of the liquid. Thixotropic liquids initially have a high viscosity which is reduced when force is applied. Thixotropic animal feed can be removed from bags with no problem because the viscosity of the animal feed is reduced by pressure on the bag, which thus allows it to flow readily out of a bag that has been torn open. The viscosity increases in a feed pocket because of the thixotropy of the liquid so that it has a low tendency to run out of the pocket.

At least 0.01 vol % amino acids, for example, methionine, preferably DL-methionine, glycine and/or cysteine, preferably L-cysteine, is added to the animal feed according to this disclosure. The taste can be improved by adding amino acids. Furthermore, nutritional deficiencies can be compensated in this way. The animal feed preferably contains 0.01 vol % to 0.5 vol % amino acids, especially preferably 0.01 vol % to 0.1 vol % amino acids.

To improve the taste, the animal feed according to this disclosure contains at least 0.01 vol % plant-based sugar, for example, xylose or dextrose.

An advantageous refinement provides that the animal feed contains at most 2 vol % lactose, preferably at most 1 vol % lactose, for example, no more than 0.5 vol % lactose. Cats cannot tolerate lactose and therefore the animal feed according to this disclosure is preferably produced on the basis of reduced-lactose milk.

Another advantageous refinement of this disclosure provides that the animal feed contains at least 0.1 vol % plant-based fibers for promoting digestion. The animal feed preferably contains at least 0.5 vol % vegetable fiber as a digestive aid. The healthy effect of the animal feed can be further improved by adding vegetable fiber as dietary fiber. For example, the animal feed may contain 0.5 vol % to 2 vol % *psyllium* fibers. *Psyllium* is also referred to as *Plantago ovata* or blond plantain. Alternatively or additionally, the animal feed may contain 0.1 vol % to 3 vol % inulin fiber. Alternatively or additionally, the animal feed may also contain lignocellulose fiber as dietary fiber, preferably at least 0.5 vol %. For example, the animal feed may contain 1 vol % to 6 vol % lignocellulose fiber.

Another advantageous refinement of this disclosure provides that the animal feed contains at least 1 vol % malt. The animal feed may contain up to 15 vol % malt. Malt is easily digested and improves the taste.

In addition, vitamins, minerals and/or amino acid derivatives, such as taurine, may be mixed with the animal feed.

Animal feed according to this disclosure is suitable as a supplementary feed for meat-based animal feed, for example, moist feed in particular. One aspect of this disclosure therefore relates to a package of first bags containing an animal feed according to this disclosure and an equal number of second bags containing a second animal feed, this one based on meat. The animal feed according to this disclosure can be fed as a second course or desert after a traditional meat-based animal feed, in particular as a digestive aid, for example.

In the simplest case, the package according to this disclosure may consist of a single bag containing the milk-based feed according to this disclosure and a single bag containing meat-based feed. However, the package according to this disclosure may also contain a larger number of first and second bags, for example, two to ten first bags and equal number of second bags.

The bags may form a package by being enclosed by a shared outer package. For example, the bags in a package according to this disclosure may be welded together in plastic film and/or packaged in a box. When a customer purchases a package according to this disclosure, he obtains one or more meals for his cat, each meal consisting of one portion of meat-based feed and one portion of a milk-based feed according to this disclosure.

The first bags preferably each contain 5 g to 15 g animal feed, and the second bags each contain 50 g to 80 g animal feed. The main course of such a meal for a cat is thus a moist feed based on meat, while the second course is the milk-based animal feed according to this disclosure. The bags can be produced from metal-coated plastic film, for example.

The first bags may be designed as tube bags and the second bags as stand-up pouches.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
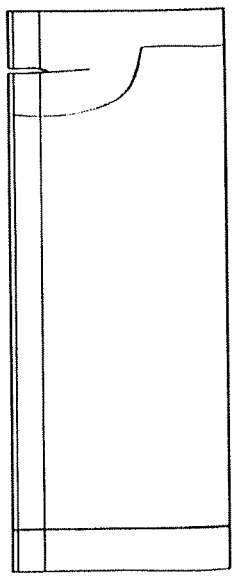
FIG. 1 shows one exemplary embodiment of a tube bag containing the milk-based animal feed according to this disclosure.
Figure 2:
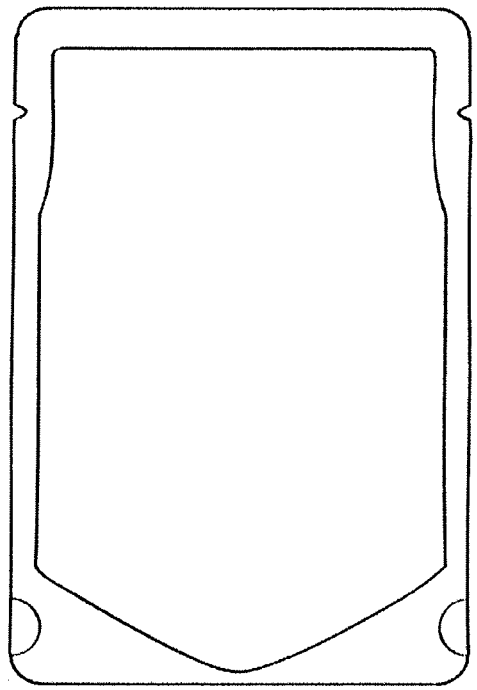
FIG. 2 shows an exemplary embodiment of a stand-up pouch containing a meat-based animal feed.

The embodiments described below are not intended to be exhaustive or to limit the invention to the precise forms disclosed in the following description. Rather, the embodiments are chosen and described so that others skilled in the art may appreciate and understand the principles and practices of this disclosure.

A stand-up pouch has two side walls joined to one another at their longitudinal edges and at one upper edge, for example, by gluing or welding. At their lower edges, the two side walls are glued or welded to the bottom. A tube bag has no such bottom. The side walls are thus connected directly to one another around the periphery.

In a method according to this disclosure for producing an animal feed according to this disclosure for domestic cats, powdered milk is mixed with water and amino acids, plant-based sugar and starch are added, thereby resulting in a mixture having a water content of at least 70 vol %, a milk protein content of 2 to 13 vol %, a milk fat content of 2 to 13 vol %, an amino acid content of at least 0.01 vol %, a plant-based sugar content of at least 0.01 vol % and a starch content of 1 to 5 vol %. In addition, vegetable fiber, malt and/or other additives as described above may be added. The mixture is then sealed in a bag and next sterilized by heating to a temperature of at least 100° C. This makes it possible to produce an animal feed that is stable in storage for two years when unopened.

An advantageous refinement of this disclosure provides that the animal feed in the bag is heated to a temperature of at least 105° C. The animal feed is preferably heated in the bag to a temperature of at least 120° C. The animal feed is preferably not heated above 140° C. The animal feed may be sterilized at a temperature of 120° C. to 130° C., for example.

Another advantageous refinement of this disclosure provides that the animal feed is boiled in the bag for at least 5 minutes at a temperature of more than 100° C. Therefore, not only is the animal feed sterilized, but also an advantageous consistency is achieved because the starch added as a thickener forms hydrocolloids in the process. The animal feed is preferably boiled in the bag for at least 10 minutes, especially preferably for at least 15 minutes at a temperature of at least 100° C. Boiling times of more than 30 minutes are not associated with any particular advantages. Therefore, boiling times of less than 30 minutes, for example, less than 25 minutes are preferred for efficient and energy-saving production. When boiling, the animal feed is preferably kept at a temperature of at least 105° C., for example, at least 120° C.

Another advantageous refinement of this disclosure provides that the animal feed is boiled in the bag at a pressure of at least 1.5 bar, for example, at a pressure of more than 2.5 bar. A pressure of more than 4.5 bar does not bring any particular advantage. A pressure less than 4.5 bar, for example, less than 3.5 bar, is therefore preferred for efficient and energy-saving production.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A liquid, milk-based animal feed for domestic cats or dogs, comprising:
   at least 70 vol % water;
   2-13 vol % milk protein;
   6-13 vol % milk fat;
   1-5 vol % starch as thickener;
   at least 0.01 vol % amino acid additive;
   at least 0.01 vol % dextrose; and
   at least 0.1 vol % plant-based fiber.

2. The animal feed according to claim 1, wherein at least 0.01 vol % cysteine, glycine and/or methionine is added as the amino acid additive.

3. The liquid animal feed according to claim 1, wherein the animal feed is thixotropic.

4. The animal feed according to claim 1, further comprising at least 0.5 vol % plant-based fiber.

5. The animal feed according to claim 1, wherein the plant based fiber comprises 0.5 to 3 vol % *psyllium* fiber.

6. The animal feed according to claim 1, wherein the plant based fiber comprises 0.1 to 3 vol % inulin fiber.

7. The animal feed according to claim 1, wherein the plant based fiber comprises at least 0.5 vol % lignocellulose fiber.

8. The animal feed according to claim 1, wherein the plant based fiber comprises 1 to 6 vol % lignocellulose fiber.

9. The animal feed according to claim 1, further comprising at least 1 vol % malt.

10. The animal feed according to claim 1, further comprising a bag in which the feed is packaged under sterile conditions.

11. The animal feed according to claim 1, further comprising lactose in an amount greater than 0 vol % and less than 1 vol %.

12. A package having one or more first bags containing a first liquid, milk-based animal feed according to claim 1 and having an equal number of second bags each containing a second animal feed including meat.

13. The package according to claim 12, wherein the first animal feed is packaged in tube bags or in four-edge sealed bags and the second animal feed is packaged in stand-up pouches.

14. The package according to claim 12, wherein the one or more first bags each contain 5 g to 15 g of the first animal feed and the second bags each contain 50 g to 80 g of the second animal feed.

15. A method for producing the liquid, milk-based animal feed according to claim 1, comprising:
   mixing powdered milk with water and amino acids;
   adding dextrose, plant-based fiber, and starch to obtain a mixture with a water content of at least 70 vol %, a milk protein content of 2 to 13 vol %, a milk fat content of 6 to 13 vol %, an amino acid content of at least 0.01 vol %, a dextrose content of at least 0.01 vol %, a plant-based fiber content of at least 0.1 vol %, and a starch content of 1 to 5 vol %; and
   sealing the mixture in a tube bag and then sterilizing said sealed mixture by heating at a temperature of at least 100° C.

16. The method according to claim 15, wherein the animal feed is boiled for at least 5 minutes at a temperature of more than 100° C.

17. The method according to claim 15, wherein the animal feed is heated in the tube bag to more than 100° C. at a pressure of at least 1.5 bar.

18. A liquid, milk-based animal feed for domestic cats or dogs, comprising:
- at least 70 vol % water;
- 2-13 vol % milk protein;
- 6-13 vol % milk fat;
- 1-5 vol % starch as thickener;
- at least 0.01 vol % amino acid additive;
- at least 0.01 vol % dextrose;
- at least 1 vol % malt;
- 0.5 to 3 vol % *psyllium* fiber and/or 0.1 to 3 vol % inulin fiber and/or at least 0.5 vol % lignocellulose fiber; and
- wherein the animal feed is thixotropic.

19. A liquid, milk-based animal feed for domestic cats or dogs, comprising:
- at least 70 vol % water;
- 2-13 vol % milk protein;
- 6-13 vol % milk fat;
- 1-5 vol % starch as thickener;
- at least 0.01 vol % amino acid additive;
- at least 0.01 vol % plant-based sugar; and
- a fermentable fiber consisting of one of 0.5 to 3 vol % *psyllium* fiber or 0.1 to 3 vol % inulin fiber.

20. The animal feed according to claim 19, wherein the fermentable fiber consists of 0.5 to 3 vol % *psyllium* fiber.

21. The animal feed according to claim 19, wherein the fermentable fiber consists of 0.1 to 3 vol % inulin fiber.

* * * * *